(12) United States Patent
Stannigel et al.

(10) Patent No.: US 12,496,026 B2
(45) Date of Patent: Dec. 16, 2025

(54) X-RAY IMAGING METHOD AND SYSTEM FOR REDUCING OVERLAPPING OF NEIGHBORING TEETH IN PANORAMIC IMAGES

(71) Applicant: DENTSPLY SIRONA Inc., York, PA (US)

(72) Inventors: Kai Stannigel, Weinheim (DE); Stefan Eichner, Heidelberg (DE); Michael Elvers, Darmstadt (DE)

(73) Assignee: Dentsply Sirona Inc., York, PA (US)

( * ) Notice: Subject to any disclaimer, the term of this patent is extended or adjusted under 35 U.S.C. 154(b) by 281 days.

(21) Appl. No.: 18/026,617

(22) PCT Filed: Sep. 14, 2021

(86) PCT No.: PCT/EP2021/075174
§ 371 (c)(1),
(2) Date: Mar. 16, 2023

(87) PCT Pub. No.: WO2022/063629
PCT Pub. Date: Mar. 31, 2022

(65) Prior Publication Data
US 2023/0309938 A1    Oct. 5, 2023

(30) Foreign Application Priority Data

Sep. 24, 2020 (EP) .................... 20198178

(51) Int. Cl.
*A61B 6/51* (2024.01)
*A61B 6/50* (2024.01)
*G06T 7/00* (2017.01)

(52) U.S. Cl.
CPC ............ *A61B 6/501* (2013.01); *G06T 7/0012* (2013.01); *G06T 2207/10116* (2013.01); *G06T 2207/20084* (2013.01)

(58) Field of Classification Search
CPC .. A61B 6/00; A61B 6/51; A61B 6/501; A61B 6/5258; A61B 6/54; G06T 7/00;
(Continued)

(56) References Cited

U.S. PATENT DOCUMENTS

2009/0310845 A1    12/2009 Ogawa et al.
2015/0320320 A1    11/2015 Kopelman et al.
(Continued)

FOREIGN PATENT DOCUMENTS

CA    3192774 A1    3/2022
CN    105934201 A    9/2016
(Continued)

OTHER PUBLICATIONS

International Search Report; PCT/EP2021/075174; Nov. 5, 2021 (completed); Nov. 11, 2021 (mailed).
(Continued)

*Primary Examiner* — Jurie Yun
(74) *Attorney, Agent, or Firm* — SCHWEGMAN LUNDBERG & WOESSNER, P.A.

(57) ABSTRACT

A method for generating a panoramic image with reduced overlapping of neighboring teeth, including: acquiring 2D x-ray images respectively at a different radiographic directions by a rotating an x-ray source and an x-ray detector around the jaw of a patient. It includes a step of identifying one or more regions each including at least one pair of overlapping neighboring teeth in the 2D x-ray images and/or in temporary panoramic images reconstructed from the 2D x-ray images for which an optimal radiographic directions are determined, among the corresponding radiographic directions, which reduces the overlap in the panoramic image to be reconstructed. It includes determining one or more optimal radiographic directions respectively among the corresponding radiographic directions of the 2D x-ray
(Continued)

images for which one or more regions each including at least one pair of overlapping neighboring teeth has been identified, to reduce the overlaps in the panoramic image to be reconstructed.

13 Claims, 2 Drawing Sheets

(58) Field of Classification Search
CPC ......... G06T 7/0012; G06T 2207/10116; G06T 2207/20084; G06N 20/00; G06N 3/08; G06V 10/26; G06V 10/421; G06V 2201/03
See application file for complete search history.

(56) References Cited

U.S. PATENT DOCUMENTS

| | | | |
|---|---|---|---|
| 2020/0175681 A1 | 6/2020 | Ezhov et al. | |
| 2020/0411167 A1 | 12/2020 | Kearney et al. | |

FOREIGN PATENT DOCUMENTS

| | | | |
|---|---|---|---|
| CN | 106999142 | A | 8/2017 |
| CN | 116234498 | A | 6/2023 |
| EP | 3973882 | A1 | 3/2022 |
| EP | 3973882 | B1 | 3/2024 |
| JP | 2007136163 | A | 6/2007 |
| JP | 2014161636 | A | 9/2014 |
| JP | 2017521113 | A | 8/2017 |
| JP | 2023543007 | A | 10/2023 |
| KR | 20230073244 | A | 5/2023 |
| WO | WO-2022063629 | A1 | 3/2022 |

OTHER PUBLICATIONS

Written Opinion of the International Searching Authority; PCT/EP2021/075174; Nov. 5, 2021 (completed); Nov. 11, 2021 (mailed).
"European Application Serial No. 04757743.2, Noting of Loss of Rights mailed May 19, 2023", 2 pgs.
"European Application Serial No. 20198178.4, Extended European Search Report mailed Mar. 16, 2021", 5 pgs.
"European Application Serial No. 20198178.4, Response filed Sep. 30, 2022 to Extended European Search Report mailed Mar. 16, 2021", 29 pgs.
"International Application Serial No. PCT/EP2021/075174, International Preliminary Report on Patentability mailed Apr. 6, 2023", 7 pgs.
"Japanese Application Serial No. 2023-519058, Notification of Reasons for Refusal mailed (May 7, 2025", w/ English Translation, 8 pgs.
"Chinese Application Serial No. 202180065067.1, Office Action mailed Jun. 6, 2025", W/English Translation, 15 pgs.
"Japanese Application Serial No. 2023-519058, Response Filed Aug. 4, 2025 to Notification of Reasons for Refusal mailed May 7, 2025", W/ English Claims, 11 pgs.

X-RAY IMAGING METHOD AND SYSTEM FOR REDUCING OVERLAPPING OF NEIGHBORING TEETH IN PANORAMIC IMAGES

CROSS-REFERENCE TO RELATED APPLICATIONS

This is a National Phase application of International Application No. PCT/EP2021/075174, filed Sep. 14, 2021, which claims the benefit of and priority to European Application Ser. No. 20198178.4, filed on Sep. 24, 2020, which are herein incorporated by reference for all purposes.

TECHNICAL FIELD OF THE INVENTION

The present invention relates to an x-ray imaging method of generating a panoramic image with reduced overlapping of neighboring teeth. The present invention also relates to an x-ray imaging system for generating a panoramic image with reduced overlapping of neighboring teeth.

BACKGROUND OF THE INVENTION

X-ray imaging system for generating panoramic images of a patient's teeth are generally known in the art. Such an-ray imaging system generally comprises an x-ray source for emitting x-ray towards a patient; an x-ray detector for detecting the x-rays transmitted through the jaw of the patient; an acquisition means adapted to acquire a plurality of 2D x-ray images respectively at a plurality of different radiographic directions by means of rotating the x-ray source and the x-ray detector around at least the jaw of the patient; and an image processing means which is adapted to reconstruct a panoramic image based on the 2D x-ray images and the radiographic directions respectively.

A commonly known problem with such panoramic problems is that the panoramic image generally includes regions where neighboring teeth overlap as shown in FIG. 1. As such, panoramic images with overlapping teeth generally complicate or prevent a successful diagnosis.

SUMMARY OF THE INVENTION

An objective of the present invention is to overcome the above-mentioned disadvantages of the prior art. This objective has been achieved by the x-ray imaging method as defined in claim 1, and the x-ray imaging system as defined in claim 13. The subject-matters of the dependent claims relate to further developments and preferable embodiments.

The present invention provides a computer-implemented x-ray imaging method for generating a panoramic image with reduced overlapping of neighboring teeth. The method comprises: a step of acquiring a plurality of 2D x-ray images respectively at a plurality of different radiographic directions by means of rotating an x-ray source and an x-ray detector around the jaw of a patient; a step of identifying one or more regions each including at least one pair of overlapping neighboring teeth in the 2D x-ray images and/or in temporary panoramic images reconstructed from the 2D x-ray images for which an optimal radiographic directions may be determined, among the corresponding radiographic directions, which reduces the overlap in the panoramic image to be reconstructed; and a step of determining one or more optimal radiographic directions respectively among the corresponding radiographic directions of the 2D x-ray images for which one or more regions each including at least one pair of overlapping neighboring teeth has been identified in the identifying step, to reduce the overlaps in the panoramic image to be reconstructed. Herein, the overlapping neighboring teeth are a pair of teeth, wherein each tooth of the pair may be on the upper jaw, or each tooth of the pair may be in the lower jaw, or one of the pair may be on the upper jaw and the other one may be on the lower jaw.

A major advantageous effect of the present invention is that through the reduction of the overlap regions, the diagnosis can be improved.

Once the optimal radiographic directions are determined, the panoramic image may be reconstructed and displayed according to various different alternative embodiments.

According to an alternative embodiment, at least a partial panoramic image is reconstructed based on the 2D x-ray images with the determined optimal radiographic directions with respect to one or more identified regions. Optionally, the reduced overlap in the identified regions can be indicated by providing some additional information on the panoramic image so that the dentist can be apprised of the fact the radiographic directions have been optimized. The additional information may be an icon, a text, an outline or the like.

According to a further alternative embodiment, at least a partial panoramic image is reconstructed based on the 2D x-ray images and the radiographic directions with respect to one or more regions as in the prior art but is provided with additional information which further comprises insets at the identified regions showing at least partial panoramic images reconstructed based on the 2D x-ray images with determined optimal radiographic directions with respect to the one or more identified regions. Through the insets, the dentist can preview the identified regions with overlap reduction and thereby apprised of the fact the radiographic directions have been optimized. The insets can be preferably selected/unselected for preview by the user through the use of an input means like keyboard cursers, a mouse or the like.

According to a further alternative embodiment, at least a partial panoramic image without overlap reduction is displayed together with at least a partial panoramic image with overlap reduction, for instance, in a toggle mode which can be switched by the user through the input means such as a keyboard, mouse or the like. Thereby, the dentist can be enabled to recognize the effect of the optimized radiographic directions.

According to a further alternative embodiment, at least a partial panoramic image is reconstructed based on the 2D x-ray images corresponding to interpolated radiographic directions which have been obtained through spatial interpolation between the determined optimal radiographic directions of the corresponding identified regions.

According to the present invention, artificial intelligence (AI) algorithms may be used in the identification of the regions each including at least one pair of overlapping neighboring teeth in the 2D x-ray images and/or in the temporary panoramic images to be reconstructed. According to the present invention, AI techniques may be also used in the determination of the optimal radiographic directions which reduce the overlaps in the panoramic image to be reconstructed. The artificial intelligence algorithm can be trained with an input of previously acquired 2D x-ray images and/or previously reconstructed panoramic images comprising manual annotations showing the said overlaps respectively. Furthermore, the artificial intelligence algorithm can be trained with an input of previously acquired 2D x-ray images or previously reconstructed panoramic images which comprise manual annotations showing the optimal radiographic directions respectively that reduce the overlaps in the panoramic image to be reconstructed.

The present invention also provides a computer-implemented x-ray imaging system for generating a panoramic image with reduced overlapping neighboring teeth. The x-ray imaging system comprises: an x-ray source for emitting x-ray towards a patient; an x-ray detector for detecting the x-rays transmitted through the jaw of the patient; an acquisition means adapted to acquire a plurality of 2D x-ray images respectively at a plurality of different radiographic directions by rotating the x-ray source and the x-ray detector around at least the jaw of the patient; and an image processing means for executing a computer program that causes the system to perform the x-ray imaging method of the present invention. The system is not provided essentially as a single apparatus. For instance, the image processing means may be in the cloud or in a computer in the practice of the radiologist.

BRIEF DESCRIPTION OF THE DRAWINGS

In the subsequent description, the present invention will be described in more detail by using exemplary embodiments and by referring to the drawings, wherein FIG. 1—is a partial schematic view of an x-ray imaging system according to an embodiment.

DETAILED DESCRIPTION OF THE INVENTION

Figure 1:
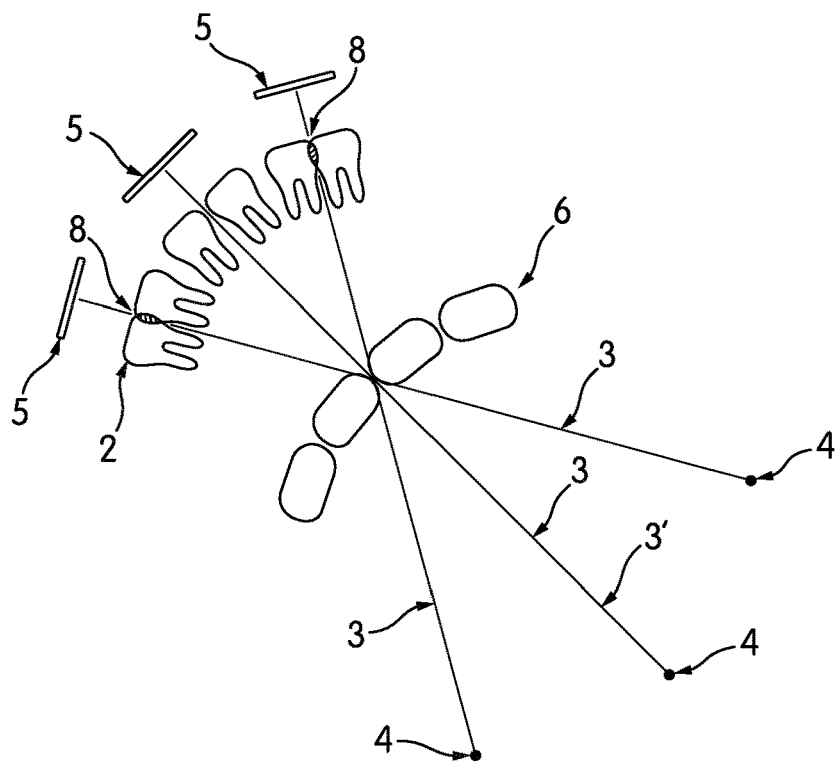

The reference numbers shown in the drawings denote the elements as listed below and will be referred to in the subsequent description of the exemplary embodiments.
1. Panoramic image (with overlap reduction)
1a. Inset
1'. Panoramic image (without overlap reduction)
2. 2D x-ray image
3. Radiographic direction
3'. Optimal radiographic direction
4. X-ray source
5. X-ray detector
6. Jaw
7. Region
8. Overlapping neighboring teeth
9. X-ray imaging system FIG. 1 shows schematic partial view of a computer-implemented x-ray imaging system (9) for generating a panoramic image (1) with reduced overlapping neighboring teeth (8). The x-ray imaging system (9) comprises: an x-ray source (4) for emitting x-ray towards a patient; an x-ray detector (5) for detecting the x-rays transmitted through the jaw (6) of the patient; an acquisition means adapted to acquire a plurality of 2D x-ray images (2) respectively at a plurality of different radiographic directions (3) by rotating the x-ray source (4) and the x-ray detector (5) around at least the jaw (6) of the patient; an image processing means which is adapted to execute a computer program according to the present invention. Further details of the x-ray imaging system (9) which are generally known to those skilled in the art will be omitted to prevent unnecessary prolongation of the description.

The computer program comprises computer-executable codes for causing the computer-implemented x-ray imaging system (9) to execute the method steps of the present invention, which will be described in more detail later in the description. The computer program may be stored in a computer-readable storage means connected to the computer-implemented x-ray imaging system (9). The connection may be external such that the storage means is in the cloud, at a remote location or in the dentist's practice.

Figure 2:
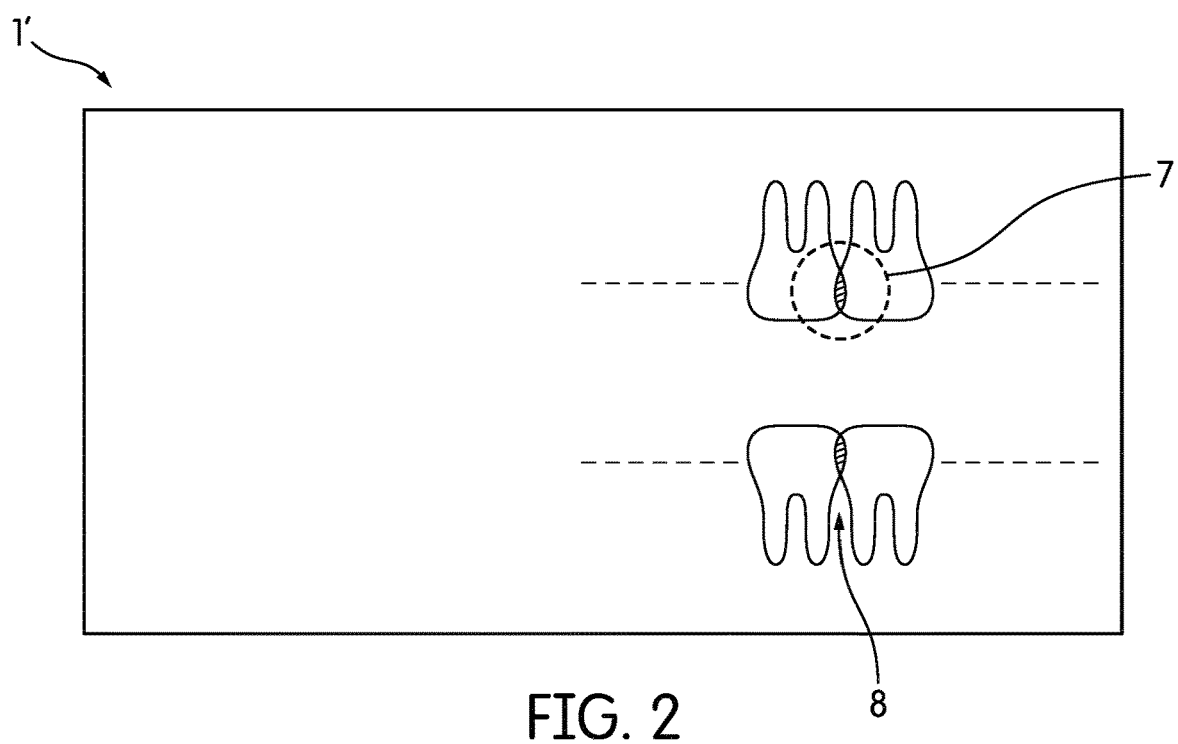
FIG. 2—is a schematic view of a panoramic image without overlap reduction in the identified regions having overlapping neighboring teeth.

The computer-implemented x-ray imaging method of the present invention is suitable for generating a panoramic image (1) with reduced overlapping of neighboring teeth (8). The method comprises a step of acquiring a plurality of 2D x-ray images (2) respectively at a plurality of different radiographic directions (3) by means of rotating an x-ray source (4) and an x-ray detector (5) around the jaw (6) of a patient; a step of identifying one or more regions (7) (see e.g. FIG. 2) each including at least one pair of overlapping neighboring teeth (8) in the 2D x-ray images (2) and/or in temporary panoramic images reconstructed from the 2D x-ray images (2) for which an optimal radiographic directions (3') (See FIG. 2) may be determined, among the corresponding radiographic directions (3), which reduces the overlap in the panoramic image (1) to be reconstructed; and a step of determining one or more optimal radiographic directions (3') respectively among the corresponding radiographic directions (3) of the 2D x-ray images for which one or more regions (7) each including at least one pair of overlapping neighboring teeth (8) has been identified in the identifying step, to reduce the overlaps in the panoramic image (1) to be reconstructed.

Figure 3:
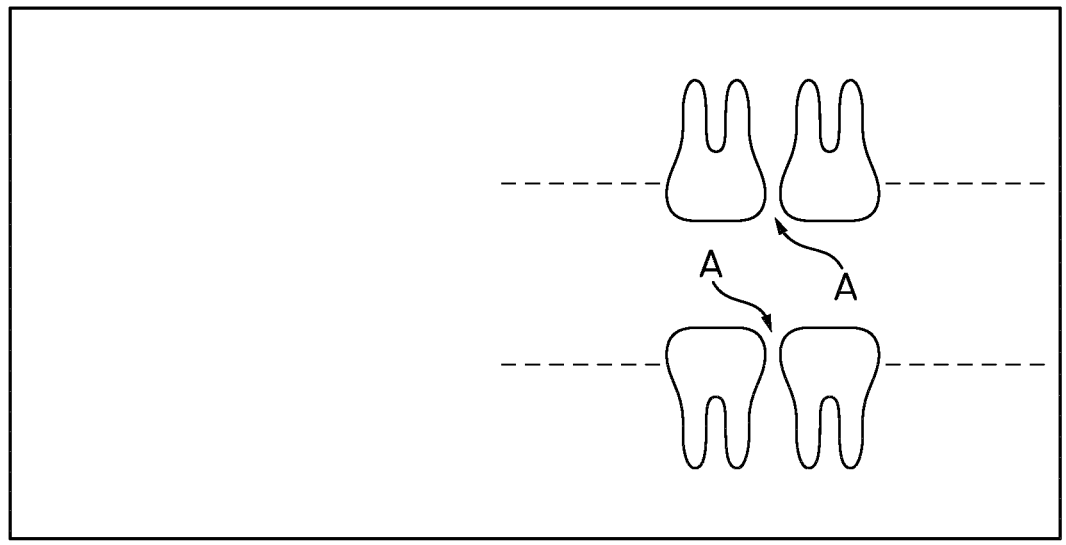
FIG. 3—is a schematic view of a panoramic image with overlap reduction according to an embodiment.
Figure 4:
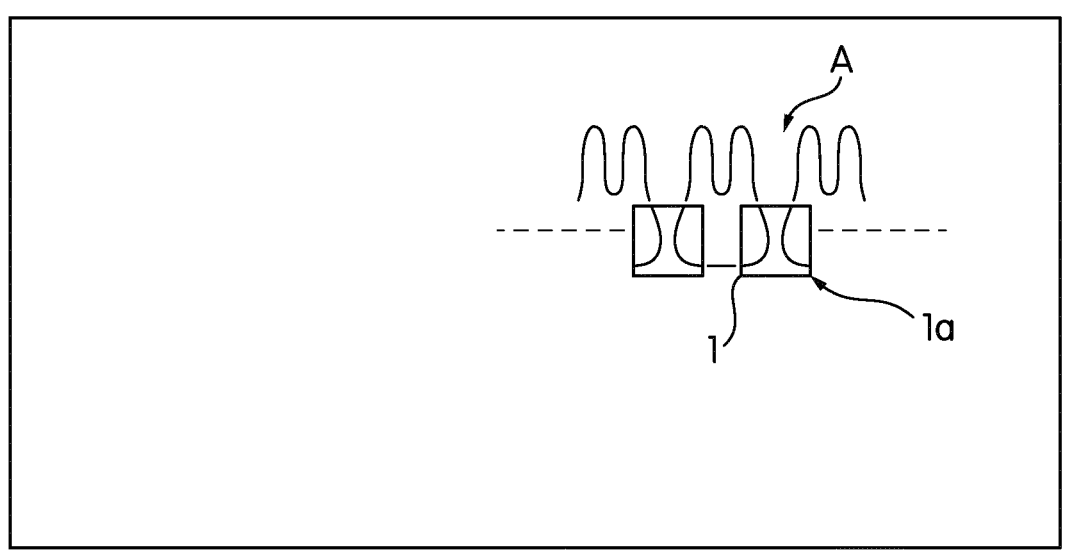
FIG. 4—is a schematic view of a panoramic image with selectable/unselectable insets with overlap reduction according to an embodiment.

In the subsequent description two different alternative embodiments will be described for reconstructing the panoramic image (1). A first alternative embodiment is provided in FIG. 3 which shows a schematic view of a panoramic image (1) with overlap reduction. The panoramic image (1) with overlap reduction can be displayed on a display of the computer-implemented x-ray imaging system (9). In the first alternative embodiment, the method comprises a step of reconstructing at least a partial panoramic image (1) based on the 2D x-ray images (2) with determined optimal radiographic directions (3') with respect to one or more identified regions (7); and a optional step of representing additional information (A) on the reconstructed panoramic image (1) to the user, which indicates the reduced overlap. As shown in FIG. 3, through the additional information (A), the dentist can be apprised of the fact that optimized radiographic directions (3') have been used in the reconstruction. The additional information may be an icon, a text, an outline or the like informing the user on the existence of the reduced overlap. Alternatively, the representation of the additional information (A) may be dispensed with. For comparison, in FIG. 2 a schematic view of a panoramic image (1') without overlap reduction has been shown. The panoramic image (1') without overlap reduction may be optionally displayed on the display of the x-ray imaging system (9) together with the panoramic image (1) with overlap reduction, for instance, in a toggle mode. Thereby the dentist can be enabled to recognize the effect of the optimized radiographic directions (3'). A second alternative embodiment is provided in FIG. 4 which shows a schematic view of a panoramic image (1') without overlap reduction but with additional information (A) which comprises insets (1a) showing at least partial panoramic images (1) with overlap reduction. In the second alternative embodiment, the method according comprises: a step of reconstructing at least a partial panoramic image (1') based on the 2D x-ray images (2) and the radiographic directions (3) with respect to one or more regions (7); and a step of representing on the reconstructed panoramic image (1') additional information (A) which comprises the insets (1a) at the identified regions (7) showing at least partial panoramic images (1) reconstructed based on the 2D x-ray images (2) with determined optimal radiographic directions (3') with respect to one or more identified regions (7). As shown in FIG. 4, through the additional information (A) including the insets (1a), the dentist can preview the identified regions (7) with overlap reduction while being apprised of the optimized radiographic directions (3'). The insets (1a) can be preferably selected for preview by the user through the use of an input means like keyboard cursers, a mouse or the like. The inset (1a) may pop up with a preset magnification or without magnification, and disappear when it is unselected. Alternatively, the insets (1a) may be fixed. The size of the insets (1a) may have the size of the identified regions (7). Also, in the second alternative embodiment, the additional information (A) may be an icon, a text, an outline or the like informing the user on the existence of a preview with reduced overlap.

According to a further alternative embodiment (not illustrated), the radiographic directions (3) in the vicinity of the optimized radiographic direction (3') can be interpolated. In this alternative embodiment, the method comprises a step of reconstructing at least a partial panoramic image (1) whose image points are based on the 2D x-ray images (2) corresponding to interpolated radiographic directions which have been obtained through spatial interpolation between the determined optimal radiographic directions (3') of the corresponding identified regions (7).

In the subsequent description, the use of deep learning techniques will briefly described. Trained artificial intelligence algorithms may be used in the identification step and/or in the determination steps.

According to a further embodiment, in the identifying step a trained artificial intelligence algorithm is used to identify one or more regions (7) each including at least one pair of overlapping neighboring teeth (8) in the 2D x-ray images (2) and/or in temporary panoramic images reconstructed from the 2D x-ray images (2). The artificial intelligence algorithm can be trained with an input of previously acquired 2D x-ray images and/or previously reconstructed panoramic images comprising manual annotations showing the said overlaps respectively. The use of the artificial intelligence is very effective in view of the speed and the reliability of the identification step. Alternatively, image processing techniques which are not based on deep learning may be used.

According to a further embodiment, in the determining step a trained artificial intelligence algorithm is used to determine one or more optimal radiographic directions (3') respectively among the corresponding radiographic directions (3) of the 2D x-ray images (2) for which one or more regions (7) each including at least one pair of overlapping neighboring teeth (8) has been identified, to reduce the overlaps in the panoramic image (1) to be reconstructed. In a first alternative of this embodiment, in the determining step a plurality of at least partial temporary panoramic images (1') are reconstructed based on 2D x-ray images (2) with respectively different radiographic directions (3) for at least one or more regions (7) each including at least one overlapping neighboring teeth (8), and the trained artificial intelligence algorithm is used to determine the optimal radiographic direction (3'), among the said different radiographic directions (3), that reduces the overlaps in the panoramic image (1) to be reconstructed, through comparing the reconstructed plurality of said at least partial temporary panoramic images (1') for the one or more identified regions (7). In a second alternative of this embodiment, in the determining step the trained artificial intelligence algorithm is used to determine the optimal radiographic direction (3') that reduces the overlaps in the panoramic image (1) to be reconstructed by comparing the set of originally acquired 2D x-ray images (2) with corresponding radiographic directions (3) for which one or more regions (7) each including at least one overlapping neighboring teeth (8) has been identified. The artificial intelligence algorithm can be trained with an input of previously acquired 2D x-ray images or previously reconstructed panoramic images which comprise manual annotations showing the optimal radiographic directions respectively that reduce the overlaps in the panoramic image (1) to be reconstructed. The use of the artificial intelligence is also here very effective in view of the speed and the reliability of the determination step. As indicated above, image processing techniques which are not based on deep learning may be alternatively used.

The invention claimed is:

1. A computer-implemented x-ray imaging method for generating a panoramic image with reduced overlapping of neighboring teeth, comprising:
acquiring a plurality of 2D x-ray images at a plurality of different radiographic directions by rotating an x-ray source and an x-ray detector around a jaw of a patient;
identifying one or more regions each including at least one pair of overlapping neighboring teeth in the plurality of 2D x-ray images and/or in temporary panoramic images reconstructed from the plurality of 2D x-ray images, among the plurality of different radiographic directions, which reduces an overlap in the panoramic image to be reconstructed;
determining one or more optimal radiographic directions among the plurality of different radiographic directions of the plurality of 2D x-ray images which have the one or more regions each including at least one pair of overlapping neighboring teeth, to reduce overlaps in the panoramic image to be reconstructed; and
reconstructing and presenting at least a portion of the panoramic image of the jaw using at least a portion of the plurality of 2D x-ray images with the one or more optimal radiographic directions.

2. The method according to claim 1, wherein identifying one or more regions comprises using a trained artificial intelligence algorithm to identify the one or more regions each including the at least one pair of overlapping neighboring teeth in the plurality of 2D x-ray images and/or in temporary panoramic images reconstructed from the plurality of 2D x-ray images.

3. The method according to claim 2, wherein the trained artificial intelligence algorithm has been trained with an input of previously acquired plurality of 2D x-ray images and/or previously reconstructed panoramic images comprising manual annotations showing the overlaps.

4. The method according to claim 1, wherein determining one or more optimal radiographic directions comprises using a trained artificial intelligence algorithm is used to determine the one or more optimal radiographic directions among the plurality of different radiographic directions of the plurality of 2D x-ray images for which one or more regions each including the at least one pair of overlapping neighboring teeth has been identified, to reduce overlaps in the panoramic image to be reconstructed.

5. The method according to claim 4, wherein determining one or more optimal radiographic directions comprises reconstructing a plurality of at least partial temporary panoramic images based on the plurality of 2D x-ray images with different radiographic directions for at least one or more regions each including at least one pair of overlapping neighboring teeth, and the trained artificial intelligence algorithm is used to determine the one or more optimal radiographic directions, among the plurality of different radiographic directions, that reduces overlaps in the panoramic image to be reconstructed, through comparing the plurality of at least partial temporary panoramic images that has been reconstructed.

6. The method according to claim 4, wherein determining one or more optimal radiographic directions comprises using the trained artificial intelligence algorithm to determine the one or more optimal radiographic directions that reduces overlaps in the panoramic image to be reconstructed by comparing the plurality of 2D x-ray images with corresponding radiographic directions for which one or more regions each including at least one pair of overlapping neighboring teeth has been identified.

7. The method according to claim 4, wherein the trained artificial intelligence algorithm is trained with an input of previously acquired plurality of 2D x-ray images and/or previously reconstructed panoramic images which comprise manual annotations showing the one or more optimal radiographic directions respectively that reduce overlaps in the panoramic image to be reconstructed.

8. The method according to claim 1, further comprising:
reconstructing at least a partial panoramic image based on the plurality of 2D x-ray images with the one or more optimal radiographic directions with respect to the one or more regions each including at least one pair of overlapping neighboring teeth, to produce a reconstructed panoramic image; and
representing additional information on the reconstructed panoramic image to a user, which indicates the overlap.

9. The method according to claim 1, further comprising:
reconstructing at least a partial panoramic image based on the plurality of 2D x-ray images and the plurality of different radiographic directions with respect to the one or more identified regions, to produce the panoramic image; and
representing on the panoramic image, additional information which comprises insets at the one or more identified regions showing at least partial panoramic images reconstructed based on the plurality of 2D x-ray images with the one or more optimal radiographic directions with respect to the one or more identified regions.

10. The method according to claim 1, further comprising:
reconstructing at least a partial panoramic image whose image points are based on the plurality of 2D x-ray images corresponding to interpolated radiographic directions which have been obtained through spatial interpolation between the one or more optimal radiographic directions of the one or more regions each including at least one pair of overlapping neighboring teeth, to produce the panoramic image.

11. A computer system for generating a panoramic image with reduced overlapping of neighboring teeth comprising at least one processor configured to:
acquire a plurality of 2D x-ray images at a plurality of different radiographic directions by rotating an x-ray source and an x-ray detector around a jaw of a patient;
identify one or more regions each including at least one pair of overlapping neighboring teeth in the plurality of 2D x-ray images and/or in temporary panoramic images reconstructed from the plurality of 2D x-ray images, among the plurality of different radiographic directions, which reduces an overlap in the panoramic image to be reconstructed;
determine one or more optimal radiographic directions among the plurality of different radiographic directions of the plurality of 2D x-ray images which have the one or more regions each including at least one pair of overlapping neighboring teeth, to reduce overlaps in the panoramic image to be reconstructed; and
reconstruct and present at least a portion of the panoramic image of the jaw using at least a portion of the plurality of 2D x-ray images with the one or more optimal radiographic directions.

12. A non-transitory computer-readable storage medium tangibly embodying a computer readable program code having computer readable instructions that, when executed, causes a processor to carry out a method of generating a panoramic image with reduced overlapping of neighboring teeth, comprising:
acquiring a plurality of 2D x-ray images at a plurality of different radiographic directions by rotating an x-ray source and an x-ray detector around a jaw of a patient;
identifying one or more regions each including at least one pair of overlapping neighboring teeth in the plurality of 2D x-ray images and/or in temporary panoramic images reconstructed from the plurality of 2D x-ray images, among the plurality of different radiographic directions, which reduces an overlap in the panoramic image to be reconstructed;
determining one or more optimal radiographic directions among the plurality of different radiographic directions of the plurality of 2D x-ray images which have the one or more regions each including at least one pair of overlapping neighboring teeth, to reduce overlaps in the panoramic image to be reconstructed; and
reconstructing and presenting at least a portion of the panoramic image of the jaw using at least a portion of the plurality of 2D x-ray images with the one or more optimal radiographic directions.

13. An x-ray imaging system for generating a panoramic image with reduced overlapping of neighboring teeth, comprising:
an x-ray source for emitting x-rays towards a patient;
an x-ray detector for detecting x-rays transmitted through a jaw of the patient;
an acquisition means adapted to acquire a plurality of 2D x-ray images respectively at a plurality of different radiographic directions by rotating the x-ray source and the x-ray detector around at least the jaw of the patient; and
an image processing means for generating a panoramic image with reduced overlapping of neighboring teeth, by:
identifying one or more regions each including at least one pair of overlapping neighboring teeth in the plurality of 2D x-ray images and/or in temporary panoramic images reconstructed from the plurality of 2D x-ray images, among the plurality of different radiographic directions, which reduces an overlap in the panoramic image to be reconstructed;
determining one or more optimal radiographic directions among the plurality of different radiographic directions of the plurality of 2D x-ray images which have the one or more regions each including at least one pair of overlapping neighboring teeth, to reduce overlaps in the panoramic image to be reconstructed; and reconstructing at least a portion of the panoramic image of the jaw using at least a portion of the plurality of 2D x-ray images with the one or more optimal radiographic directions.

* * * * *